(12) United States Patent
Yamagata

(10) Patent No.: US 12,486,924 B2
(45) Date of Patent: Dec. 2, 2025

(54) VALVE SYSTEM

(71) Applicant: AISAN KOGYO KABUSHIKI KAISHA, Obu (JP)

(72) Inventor: Masafumi Yamagata, Toyoake (JP)

(73) Assignee: AISAN KOGYO KABUSHIKI KAISHA, Obu (JP)

( * ) Notice: Subject to any disclaimer, the term of this patent is extended or adjusted under 35 U.S.C. 154(b) by 318 days.

(21) Appl. No.: 18/456,629

(22) Filed: Aug. 28, 2023

(65) Prior Publication Data

US 2024/0084921 A1    Mar. 14, 2024

(30) Foreign Application Priority Data

Sep. 8, 2022   (JP) .................. 2022-142941

(51) Int. Cl.
| | | |
|---|---|---|
| *F16K 37/00* | (2006.01) | |
| *F16K 31/04* | (2006.01) | |
| *G01L 19/08* | (2006.01) | |
| *G01L 19/00* | (2006.01) | |

(52) U.S. Cl.
CPC .......... *F16K 37/0091* (2013.01); *F16K 31/04* (2013.01); *F16K 31/046* (2013.01); *F16K 37/005* (2013.01); *G01L 19/083* (2013.01); *G01L 19/086* (2013.01); *F17C 2205/0326* (2013.01); *F17C 2250/032* (2013.01); *F17C 2250/0404* (2013.01); *F17C 2250/043* (2013.01); *G01L 19/0092* (2013.01)

(58) Field of Classification Search
CPC ..... G01L 19/083; G01L 19/08; G01L 19/086; G01L 19/0092; F16K 37/0075; F16K 37/0091; F16K 31/04; F16K 31/046; F16K 37/005; F17C 2205/0326; F17C 2250/032; F17C 2250/0404; F17C 2250/043

See application file for complete search history.

(56) References Cited

U.S. PATENT DOCUMENTS

| | | | |
|---|---|---|---|
| 10,718,281 B2 | 7/2020 | Akita | |
| 10,851,722 B2 | 12/2020 | Fukui et al. | |
| 2015/0143996 A1* | 5/2015 | Kimoto | B01D 53/0454 96/114 |
| 2021/0239066 A1* | 8/2021 | Uchida | F02M 25/0836 |

FOREIGN PATENT DOCUMENTS

| | | |
|---|---|---|
| JP | 6076885 B2 | 2/2017 |
| JP | 2018100643 A | 6/2018 |
| JP | 2019206959 A | 12/2019 |
| JP | 2021120556 A | 8/2021 |

* cited by examiner

Primary Examiner — Benjamin R Schmitt
(74) Attorney, Agent, or Firm — CONLEY ROSE, P.C.

(57) ABSTRACT

A valve system that can quickly estimate the valve opening position including a tank to store fluid, a pressure sensor having a valve element to detect an internal pressure of the tank, a valve to open and close the tank, a driving device to stroke the valve element of the valve, and a control unit.

8 Claims, 4 Drawing Sheets

VALVE SYSTEM

CROSS-REFERENCE TO RELATED APPLICATIONS

This application claims priority to Japanese patent application serial number 2022-142941, filed Sep. 8, 2022, which is hereby incorporated herein by reference in its entirety for all purposes.

BACKGROUND

This disclosure relates generally to a valve system. In particular, the present disclosure relates to a valve system including a tank configured to store fluid and a valve configured to open and close the tank.

Vehicles such as automobiles equipped with engines have an evaporated fuel treatment system that includes a fuel tank and a canister that adsorbs fuel vapor generated in the fuel tank. Normally, a vapor passage connecting the fuel tank and the canister is blocked by a sealing valve, and the sealing valve is opened only when it is necessary to adsorb the vapor in the canister. For example, the sealing valve in the system may use a stepping motor to adjust the degree of opening. Since the opening position of the valve element of the sealing valve is subject to variation due to the environment and the tolerance of the parts of the sealing valve, it is necessary to determine the opening position of the valve element of the sealing valve. In the above system, the sealing valve in the closed valve state is opened two steps at a time, and the opening position of the sealing valve is estimated based on the pressure change in the fuel tank accompanying the valve opening operation.

SUMMARY

According to an embodiment, a valve system may have a tank capable of storing fluid, a pressure sensor that has a valve element and detects an internal pressure of the tank, a valve that opens and closes the tank, a driving device to stroke the valve element of the valve, and a control unit. The control unit operating the driving device continuously moves the valve element in the closed valve state in the valve opening direction at a constant valve opening speed. The control unit stores the position of the valve element or stops the valve element when the pressure sensor detects that the internal pressure of the tank is decreased by a certain amount. The control unit is configured to estimate the valve opening position based on the stored position or stopping position of the valve element and the valve opening distance of the valve element. The above-mentioned valve opening distance of the valve element is the distance when the internal pressure is decreased by a certain amount, which is predetermined with respect to the internal pressure of the tank before the valve is opened.

DETAILED DESCRIPTION

As described above, in the conventional valve system it is estimated whether the valve has opened based on the pressure change in the tank for each two-step valve opening operation of the valve. Therefore, it takes time to estimate the valve opening position of the valve. Thus, it is desirable to provide a valve system that can quickly estimate the opening position of a valve.

Figure 1:
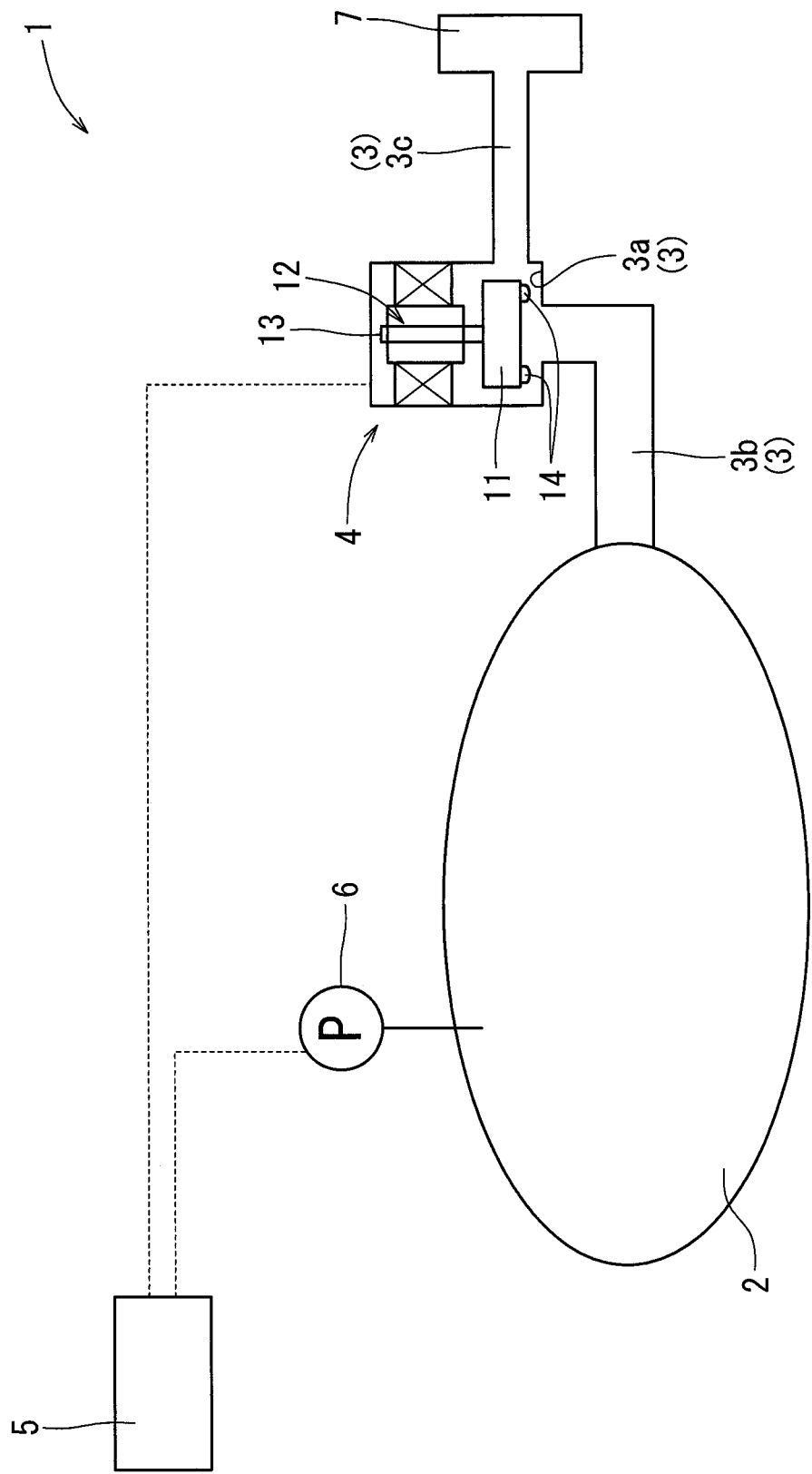
FIG. 1 is a schematic view of an embodiment of a valve system in accordance with the principles described herein.

Various embodiments are described below with reference to FIGS. 1-5. As shown in FIG. 1, a valve system 1 includes a tank 2 that forms a closed space for storing fluid, a supply destination 7 for the fluid in the tank 2, and a supply passage 3 that connects the tank 2 and the supply destination 7. The valve system 1 has a valve 4 disposed along the supply passage 3 for opening and closing the supply passage 3. When the valve 4 is opened, the fluid in the tank 2 flows through the supply passage 3 to the supply destination 7. The supply destination 7 may be, for example, a fuel cell. In this case, the valve system 1 is applied, for example, to a hydrogen fuel supply system with a hydrogen tank for supplying hydrogen fuel to the fuel cell.

The valve system 1 includes a pressure sensor 6 for measuring an internal pressure P of the tank 2 and a control unit 5. The control unit 5 may be a computer system having at least one processor and at least one memory. A measurement signal from the pressure sensor 6 is input to the control unit 5. The control unit 5 also outputs a control signal to control the operating state of the valve 4. Various programs and various data (including maps) for controlling the valve 4 are stored in the memory of the control unit 5. The control described below is realized by the processor executing a program stored in the memory. For example, controlling the flow rate of fluid through the valve 4 is one of the functions realized by executing the program.

As shown in FIG. 1, the valve 4 has a valve element 11 and a driving device (an actuator) for stroking the valve element 11. The driving device comprises, for example, a stepping motor 12 (with a rotor and a stator) and an output shaft 13 extending upwardly from the valve element 11. The stepping motor 12 strokes the valve element 11 via the output shaft 13. Specifically, a male thread is formed on the surface of the output shaft 13. The output shaft 13 is assembled with the rotor of the stepping motor 12 in a screwed state. Therefore, the output shaft 13 moves in the axial direction (in the up/down direction) in response to the rotation of the rotor. As the output shaft 13 moves up and down, the valve element 11 also moves up and down therewith.

The lower surface of the valve element 11 is provided with a rubber-like sealing member 14. When the valve element 11 is lowered by the stepping motor 12, the sealing member 14 is pressed against a seat portion 3a of the supply passage 3 from above. As a result, the valve element 11 can appropriately block the supply passage 3 to close the tank 2. Then, the valve element 11 is raised and the sealing member 14 is separated from the seat portion 3a, thereby stablishing communication between an upstream section 3b of the supply passage 3 and a downstream section 3c of the supply passage 3, thereby allowing the fluid to flow from the tank 2 toward the supply destination 7.

The control unit 5 may drive the stepping motor 12 to rotate in the forward or reverse direction by controlling the number of steps. By rotating the stepping motor 12 in the forward or reverse direction for a predetermined number of steps, the valve element 11 moves in the vertical direction (in the opening/closing direction) by a predetermined amount of stroke. In other words, the amount of stroke of the valve element 11 may be adjusted by controlling the number of steps.

By adjusting the stroke amount of the valve element 11 based on the opening position where the above sealing member 14 begins to move away from the seat portion 3a of the supply passage 3, the flow rate from the tank 2 to the supply destination 7 can be controlled. However, the opening position of the valve 4 is subject to variation due to the environment of the valve system 1 and the tolerances of the parts. Therefore, it is necessary to estimate the opening position of the valve 4 before controlling the flow rate.

Figure 2:
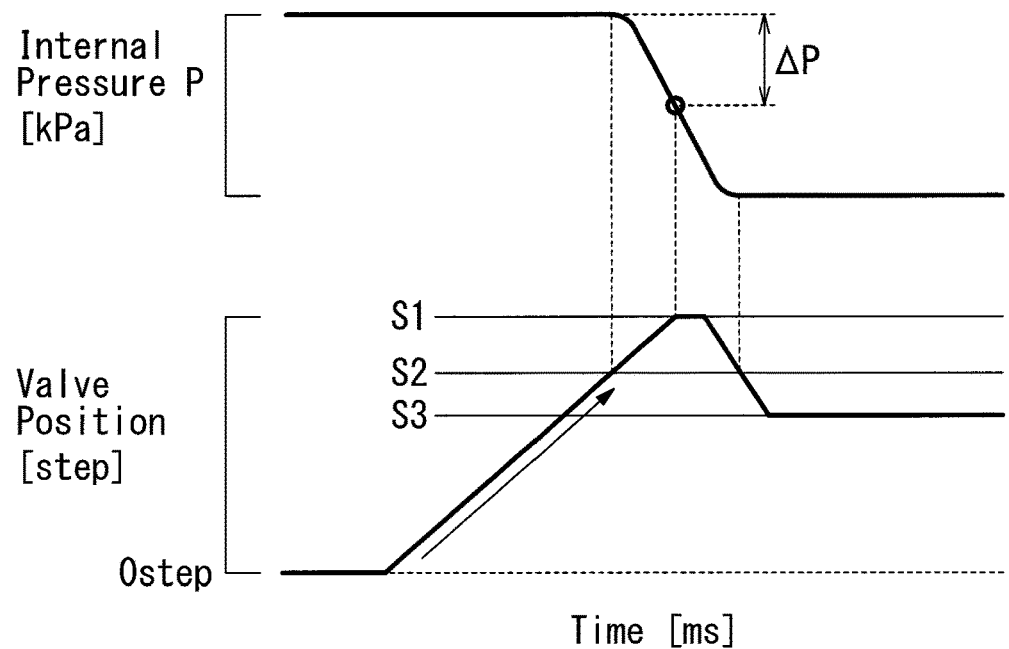
FIG. 2 is a time chart illustrating an embodiment of a method for estimating a valve opening position of the valve of the valve system of FIG. 1.

Next, a method of estimating the valve opening position of the valve 4 will be described with reference to FIG. 2. The upper graph in FIG. 2 shows the change of the internal pressure P of the tank 2 with respect to time (the horizontal axis). The internal pressure P of the tank 2 is measured by the pressure sensor 6, for example, at fixed intervals. The lower graph in FIG. 2 shows the change in the number of steps of the stepping motor 12 with respect to time (the horizontal axis), that is, the stroke amount of the valve element 11.

As shown in FIG. 2, the valve element 11 is initially lowered to the position where the number of steps of the stepping motor 12 is 0. At this position, the valve 4 is in a closed state. First, the control unit 5 continuously moves the valve element 11 in the valve opening direction at a constant speed (for example, 30 ms/step). When the supply passage 3 begins to open due to the opening motion of the valve element 11, the fluid in the tank 2 flows out and the internal pressure P of the tank 2 begins to decrease.

Next, the control unit 5 monitors the internal pressure P of the tank 2, and when it is detected that the internal pressure P of the tank 2 has decreased by a certain predetermined change in pressure $\Delta P$ (for example, 0.2 kPa), the control unit 5 stops the valve opening operation of the valve element 11. The predetermined change in pressure $\Delta P$ may be set, but is not limited to, as a multiple of the resolution (for example, 0.1 kPa) of the pressure sensor 6 used.

Figure 3:
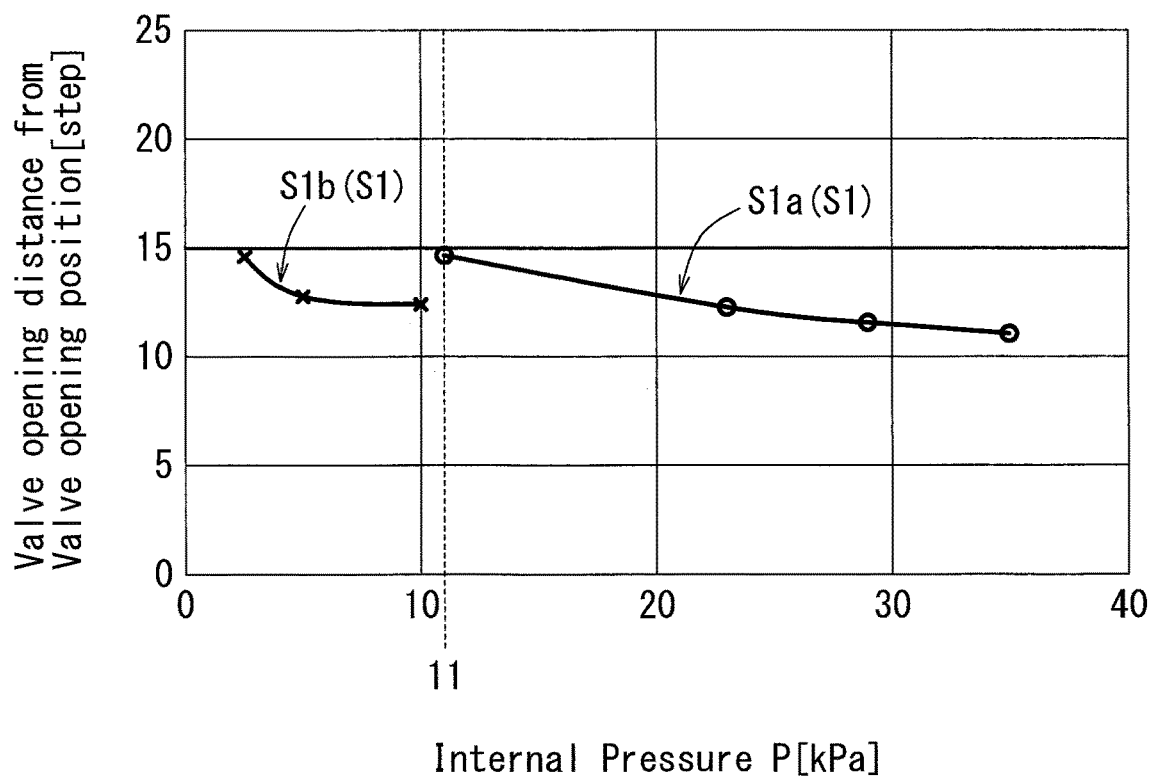
FIG. 3 is a graph illustrating a valve opening distance of the valve of the valve system of FIG. 1 based on a valve opening speed and an internal pressure of a tank before opening of the valve.

As long as the resolution of the pressure sensor 6 is finite, the stopping position S1 of the valve element 11 is a position where the valve is opened by a certain amount from the valve opening position where the supply passage 3 just starts to open. It is considered that the valve opening distance depends not only on the predetermined change in pressure $\Delta P$ but also on the valve opening speed of the valve 4 and the internal pressure P of the tank 2 before it is opened. Therefore, valve opening distances are measured in advance for various valve opening speeds and internal pressures P, or calculated based on parameters thereof, then stored in the control unit 5 in the form of a map or the like. FIG. 3 shows the valve opening distance of the valve element 11 according to the internal pressure P before the tank 2 is opened, that is, the stopping position S1 when the opening position is used as a reference. The mark "○" indicates the case where the valve element 11 is opened at 30 ms/step (a stopping position S1a). The mark "x" indicates the case where the valve element 11 is opened at 60 ms/step (a stopping position S1b). For example, when the valve opening speed is 30 ms/step and the internal pressure P of the tank 2 before opening is 11 kPa, the valve 4 opens by an amount corresponding to approximately 15 steps for decreasing the pressure of the tank 2 by 0.2 kPa.

The control unit 5 estimates the opening position of the valve 4 based on the valve opening distance until the valve stops, which is predetermined by measurement or calculation. Specifically, the position S2 obtained by subtracting the above predetermined amount of valve opening from the stopping position S1 of the valve 4 is estimated as the valve opening position (referred to as an estimated valve opening position S2).

As another embodiment (not shown), the control unit 5 may store the position (the number of steps) of the valve element 11 at the time when it detects that the internal pressure P of the tank 2 has decreased by a certain predetermined change in pressure $\Delta P$. Then, instead of the stopping position S1, a position obtained by subtracting the above predetermined valve opening distance from the stored position may be estimated as the valve opening position. This allows the valve opening position to be estimated even when it is difficult to stop the valve element 11 immediately upon detection of the predetermined change in pressure $\Delta P$.

When the valve opening speed of the valve 4 is constant, the smaller the internal pressure P before the tank 2 is opened, the longer it takes for the internal pressure P to change. Therefore, the valve opening distance of the valve element 11 until the pressure change reaches the predetermined change in pressure $\Delta P$ is increased. For example, if the opening speed of the valve 4 is always set to 30 ms/step, it can be inferred from the trend of the graph of FIG. 3 that if the internal pressure P before opening the tank 2 is smaller than 11 kPa, the valve opening distance until the predetermined change in pressure $\Delta P$ is reached is larger. Such a large opening of the valve element 11 from the valve opening position is not preferable, for example, when it is desired to suppress the flow rate from the tank 2 to the supply destination 7. There is also a concern that the valve element 11 may open excessively relative to the normal case due to the valve opening speed being too fast.

Therefore, it is desirable to reduce the opening speed of the valve 4 when the internal pressure P of the tank 2 before opening is small. For example, by setting the opening speed of the valve 4 to 60 ms/step, the valve opening distance of the valve element 11 until the internal pressure P of the tank 2 drops by 0.2 kPa can be reduced to 15 steps or less, as shown by the mark "x" in FIG. 3. Even in such a case, the opening position of the valve 4 can be estimated by subtracting the valve opening distance until the valve 4 is stopped, which is pre-measured and pre-determined, from the stopping position S1 of the valve 4. By changing the valve opening speed of the valve 4 according to the internal pressure P of the tank 2 before the tank 2 is opened in this manner, the valve opening position can be accurately estimated without excessively increasing the flow rate. The above specific valve opening speed is only an example. Any appropriate valve opening speed can be set according to the internal pressure of the tank and the predetermined change in pressure. In addition, three or more speeds can be set according to the internal pressure of the tank before the tank is opened.

Figure 4:
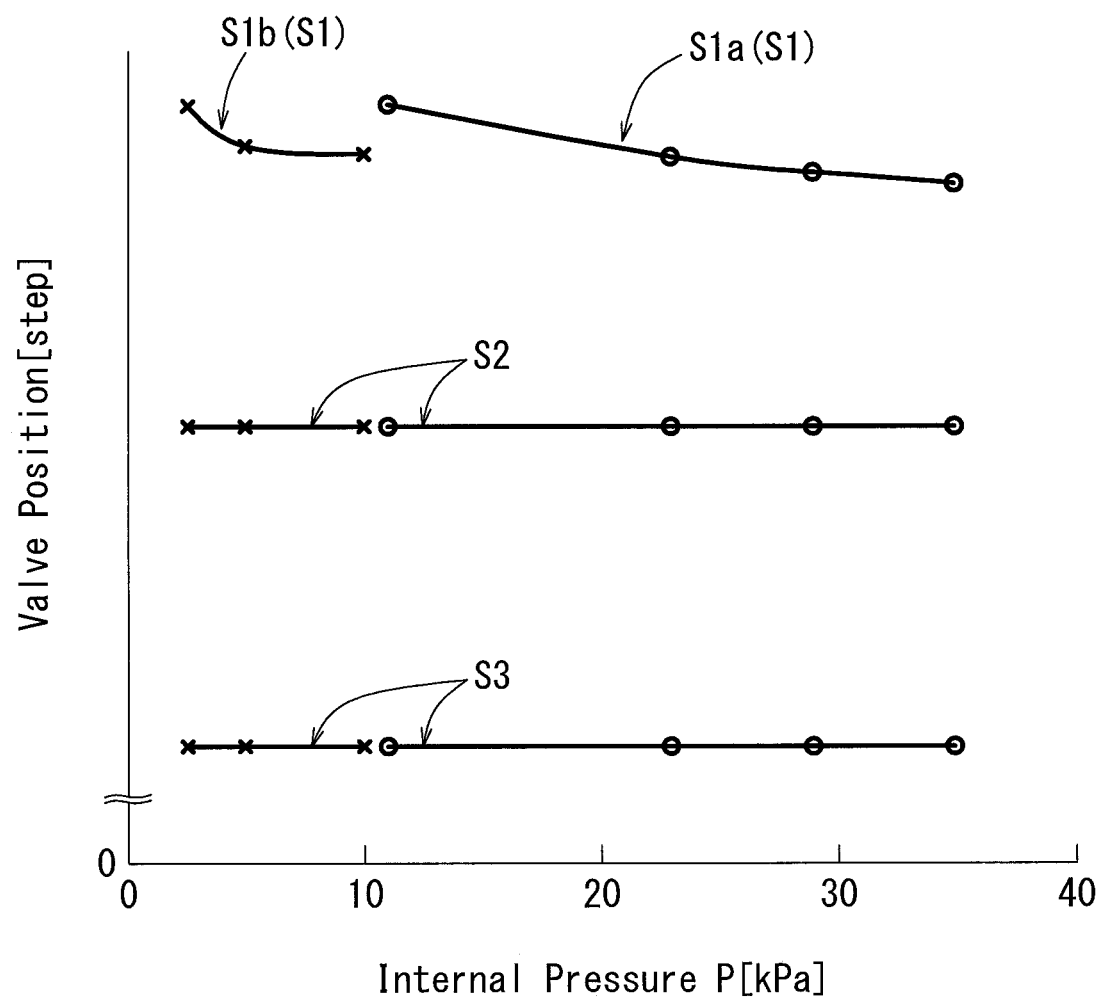
FIG. 4 is a graph illustrating the estimated open position and the estimated standby position of the valve of the valve system of FIG. 1.

As shown in FIG. 2, after estimating the estimated valve opening position S2, the valve 4 may be closed to a standby position S3 after waiting for a certain time required for the valve 4 to reverse. The standby position S3 is located on the closing side of the valve from the estimated valve opening position S2. For example, the standby position S3 may be a position where the valve is closed by 16 steps from the estimated valve opening position S2. By closing the valve 4 to the standby position S3, the valve 4 can be maintained in a properly sealed state even if it is subjected to vibration, etc. from the surroundings. FIG. 4 shows the stopping position S1, the estimated valve opening position S2, and the standby position S3 of the valve 4 according to the internal pressure P before the tank 2 is opened. The standby position S3 does not necessarily have to be a position where the valve 4 is closed by 16 steps from the estimated valve opening position S2, but can be located on the closing side of the valve from the estimated valve opening position S2.

Figure 5:
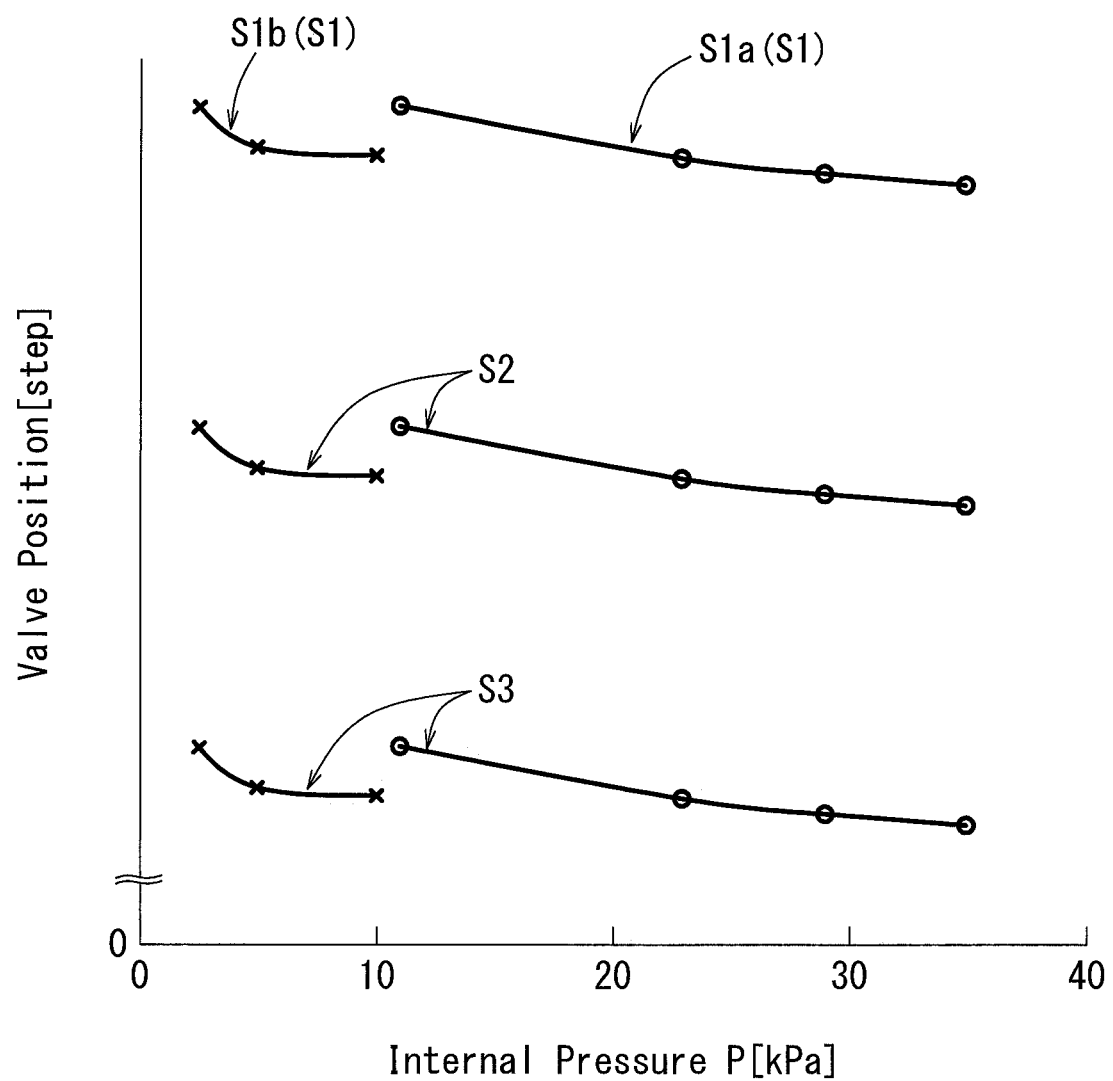
FIG. 5 is a graph illustrating the open position and standby position of the valve of the valve system of FIG. 1 as determined by a control unit.

As another embodiment, the control unit 5 may roughly estimate the valve opening position of the valve 4 without using the data of the valve opening distance determined by measurement or other means in advance as shown in FIG. 3. For example, if the above valve opening distance data is obtained, when the internal pressure P before opening the tank 2 is 11 kPa≤P≤35 kPa, it is known in advance that by setting the valve opening speed to 30 ms/step, the valve opening distance at the stopping position S1 is 15 steps or less for any internal pressure in the above range. In addition, when the internal pressure P before opening the tank 2 is 2 kPa<P<11 kPa, it is known in advance that by setting the valve opening speed to 60 ms/step, the valve opening distance at the stopping position S1 is 15 steps or less for any internal pressure in the above range. In such a case, as shown in FIG. 5, the position S2 obtained by subtracting 15 steps from the stopping position S1 of the valve 4 is regarded as the valve opening position regardless of the internal pressure of the tank 2. This is referred to herein as a roughly estimated valve opening position S2. The valve 4 closes at least the supply passage 3 at the roughly estimated valve opening position S2. Therefore, the estimated valve opening position S2 can be determined more quickly. Then, the valve 4 may be put on standby at a position obtained by subtracting a predetermined distance (for example, 16 steps) from the estimated valve opening position S2 (the standby position S3).

As another embodiment, the control unit 5 may store the position of the valve element 11 at the time when the internal pressure P of the tank 2 is detected to have decreased by the predetermined change in pressure ΔP. The position obtained by subtracting a certain amount of stroke (for example, 15 steps) from the stored position may be regarded as the estimated valve opening position.

To summarize the above, a valve system 1 has a tank 2 that stores a fluid, a pressure sensor 6 that detects the internal pressure of the tank 2, a valve 4 that has a valve element 11 that functions to open and close the tank 2, a driving device to stroke the valve element 11 of the valve 4, and a control unit 5. The control unit 5 operates the driving device to continuously move the valve element 11 from the closed valve state in the valve opening direction at a constant valve opening speed. The control unit 5 stores the position of the valve element 11 or stops the valve element 11 when the pressure sensor 6 detects that the internal pressure of the tank 2 is decreased by a certain predetermined amount. The control unit 5 is configured to estimate the estimated valve opening position S2 based on the stored position or stopping position of the valve element 11 and the valve opening distance of the valve element 11. The above-mentioned valve opening distance of the valve element 11 is the distance until the internal pressure decreases by a certain amount, which is predetermined with respect to the internal pressure of the tank 2 before the valve is opened. With such a configuration, the valve opening position of the valve 4 can be estimated more quickly than the method of intermittently moving the valve element 11 in the valve opening direction and estimating whether the valve is opened each time.

In another embodiment, the control unit 5 operates the driving device to continuously move the valve element 11 from the closed valve state in the valve opening direction at a constant valve opening speed. The control unit 5 stores the position of the valve element 11 or stops the valve element 11 when the pressure sensor 6 detects that the internal pressure of the tank 2 is decreased by a certain predetermined amount. Then, the control unit 5 regards a position obtained by subtracting a certain amount of stroke from the stored position or stopping position S1 of the valve element 11 as an estimated valve opening position S2. The certain amount of stroke means the amount of stroke equal or larger than the valve opening distance of the valve element 11 until the internal pressure decreases by a certain amount, which is predetermined with respect to the internal pressure of the tank 2 before the valve is opened. With such a configuration, the roughly estimated valve opening position S2 can be determined more quickly. If the estimated valve opening position S2 can be determined even if it is a rough estimate, the controllability of the flow rate can be improved compared to the case where the valve opening position is completely unknown, and the appropriate standby position S3 of the valve 4 can be set.

Based on the internal pressure of the tank 2 before the tank opens, the control unit 5 is configured to change the opening speed of the valve 4, so that the predetermined opening distance of the valve element 11 until the internal pressure decreases by a certain amount is less than a predetermined distance. With such a configuration, the estimated valve opening position S2 can be accurately estimated or determined without opening the valve 4 too much.

The stepping motor 12 may be used as the driving device. With such a configuration, the estimated valve opening position S2 of the valve 4 can be estimated or determined more quickly even if the stepping motor 12, which has a large influence on variations due to environmental conditions or parts, is used.

Further, the control unit 5 is configured to set as a standby position S3 of the valve 4, a position obtained by moving the valve 4 from the estimated valve opening position S2 by a pre-determined amount in the valve closing direction. With such a configuration, even if the valve 4 receives an external force such as vibration from the outside, the valve can be properly closed while maintaining the sealing performance.

In addition to the hydrogen fuel supply system, the valve system described above can also be used in connection with, for example, an evaporative fuel treatment system with a fuel tank for storing automobile fuel, a canister for adsorbing fuel vapor evaporated from the fuel tank, and a vapor passage connecting the fuel tank and the canister. The valve system can be widely applied to any other system with a tank that stores fluid and a valve that opens and closes the tank.

As another embodiment, the driving device may be a linear solenoid, DC motor system, etc. in addition to the stepping motor. Any other driving device may be used as long as it can electrically drive the valve plug of the valve.

The various examples described above in detail with reference to the attached drawings are intended to be representative of the present disclosure and are thus non-limiting embodiments. The detailed description is intended to teach a person of skill in the art to make, use, and/or practice various aspects of the present teachings, and thus does not limit the scope of the disclosure in any manner. Furthermore, each of the additional features and teachings disclosed above may be applied and/or used separately or with other features and teachings in any combination thereof, to provide an improved valve system, and/or methods of making and using the same.

What is claimed is:

1. A valve system for estimating a valve opening position, the valve system comprising:
    a tank for storing fluid;
    a pressure sensor configured to detect an internal pressure of the tank;
    a valve for opening and closing the tank, wherein the valve includes a valve element;
    a driving device configured to stroke the valve element; and
    a control unit configured to operate the driving device, wherein the control unit is configured to:
        continuously move the valve element from a closed valve state in a valve opening direction at a constant valve opening speed;
        store a position of the valve element or stop the valve element when the pressure sensor detects that an internal pressure of the tank decreases by a certain amount; and
        estimate the valve opening position based on the stored position or stopping position of the valve element and a valve opening distance of the valve element, wherein the valve opening distance is the distance when the internal pressure of the tank decreases by an amount wherein the amount is predetermined by the internal pressure of the tank before the valve opens.

2. The valve system of claim 1, wherein the control unit is configured to change an opening speed of the valve based on the internal pressure of the tank before the tank opens so that the valve opening distance of the valve element until the internal pressure decreases by the certain amount is less than a predetermined distance.

3. The valve system of claim 1, wherein the driving device is a stepping motor.

4. The valve system of claim 1, wherein the control unit is configured to set a standby position of the valve, wherein the standby position of the valve is obtained by moving the valve from the estimated valve opening position by a pre-determined amount in the valve closing direction.

5. A valve system for estimating a valve opening position, the system comprising:
    a tank for storing fluid;
    a pressure sensor configured to detect an internal pressure of the tank;
    a valve configured to open and close the tank, wherein the valve includes a valve element;
    a driving device configured to stroke the valve element; and
    a control unit configured to operate the driving device, wherein the control unit is configured to:
        continuously move the valve element from a closed valve state in a valve opening direction at a constant valve opening speed;
        store a position of the valve element or stop the valve element when the pressure sensor detects that an internal pressure of the tank decreases by a certain amount; and
        regard a position obtained by subtracting a certain amount of stroke from the stored position or the stopping position of the valve element as an estimated valve opening position, wherein the certain amount of stroke is the amount of stroke equal or larger than the valve opening distance of the valve element until the internal pressure decreases by a certain amount, which is predetermined with respect to the internal pressure of the tank before the valve is opened.

6. The valve system of claim 5, wherein the control unit is configured to change an opening speed of the valve based on the internal pressure of the tank before the tank opens, so that the valve opening distance of the valve element until the internal pressure decreases by the certain amount is less than a predetermined distance.

7. The valve system of claim 5, wherein the driving device is a stepping motor.

8. The valve system of claim 5, wherein the control unit is configured to set a standby position of the valve, wherein the standby position of the valve is obtained by moving the valve from the estimated valve opening position by a pre-determined amount in the valve closing direction.

* * * * *